US006888456B2

(12) United States Patent
Cheng et al.

(10) Patent No.: US 6,888,456 B2
(45) Date of Patent: May 3, 2005

(54) METHOD AND APPARATUS FOR DETECTING MOVEMENT OF AN OBJECT AND MEASURING TOLERABLE DISTANCE

(75) Inventors: Steven D. Cheng, San Diego, CA (US); Chunming Chen, San Diego, CA (US)

(73) Assignee: Benq Corporation, Taoyuan (TW)

( * ) Notice: Subject to any disclaimer, the term of this patent is extended or adjusted under 35 U.S.C. 154(b) by 34 days.

(21) Appl. No.: 10/431,899

(22) Filed: May 8, 2003

(65) Prior Publication Data

US 2004/0222885 A1 Nov. 11, 2004

(51) Int. Cl.[7] .............................. H04Q 7/00; H04Q 7/20

(52) U.S. Cl. ............................ 340/539.21; 340/539.32; 340/573.3; 455/421; 455/456.5; 455/115.1; 455/115.3; 455/134

(58) Field of Search ........................ 340/539.21, 539.32, 340/573.3, 573.4; 455/456.6, 9, 10, 115.1, 115.3, 421, 134, 456.1, 456.5

(56) References Cited

U.S. PATENT DOCUMENTS 4,785,291 A * 11/1988 Hawthorne .............. 340/573.4
5,049,875 A * 9/1991 DeLuca et al. ............ 340/7.58
5,119,072 A * 6/1992 Hemingway ............ 340/573.1

* cited by examiner

*Primary Examiner*—Donnie L. Crosland
(74) *Attorney, Agent, or Firm*—Snell & Wilmer L.L.P.

(57) ABSTRACT

A method and an apparatus for determining whether an object is moved are provided. The object is disposed in a communication system having many base stations. The apparatus includes a receiver, a controller, and a warning device. During a predetermined period, the apparatus respectively receives and measures signals from each of the base stations to derive a first average value. Meanwhile, a tolerable probability value is inputted. According to the tolerable probability value and the first average value, the apparatus gets a tolerable range. Next, the apparatus continues to receive and measure signals to derive a second average value. Finally, the apparatus determines whether the object is moved in accordance with the second average value and the tolerable range. If moved, the apparatus sends out a warning signal.

19 Claims, 6 Drawing Sheets

METHOD AND APPARATUS FOR DETECTING MOVEMENT OF AN OBJECT AND MEASURING TOLERABLE DISTANCE

FIELD OF INVENTION

The present invention relates to a method and apparatus for determining whether an object is moved, and more particularly, to a method and apparatus for measuring a tolerable distance.

BACKGROUND OF THE INVENTION

Generally speaking, some users or service providers would like their objects, such as vending machines and automatic teller machines, to be without mobility capability and to reside in specific places permanently. Since those objects usually are quite expensive, the owners of the objects certainly do not expect anyone to steal or move them. If moved by surprise, the owners of the objects would like to get alert as soon as possible. Take an automatic teller machine for example, when the automatic teller machine is moved by surprise, and bank owners do not get alert and are not able to track it right away, the financial damage will become absolutely out of control and reputation of the bank will be ruined.

To prevent the above problems, most providers often hire security service guards to keep a regular check on those objects. This kind of action, however, not only wastes lots of time and efforts, but also cannot detect the object as it is being stolen and moved, not to mention further track it's current position.

Therefore, a method and apparatus for determining whether an object is moved is necessary. Thereby, when the object is moved out of its original position by surprise, stolen or damaged, we can alert its owners right away and prevent serious damage.

SUMMARY OF THE INVENTION

One aspect of the present invention is to provide a method and apparatus for determining whether an object is moved or not. The object is disposed in a communication system and has a receiver. The object can receive N signals broadcast by N base stations near around.

According to the method of the present invention, during a predetermined period, signals broadcasted from each base station are received and measured in order to derive a first average value. Meanwhile, a tolerable probability is inputted. The method calculates a tolerable range in accordance with the tolerable probability and the first average value. During a unit period, the method respectively receives and measures signals broadcasted from each base station to derive a second average value. Finally, the method compares the second average value and the tolerable range, and by the comparison, determines whether the object is moved. If moved, a warning signal will be sent out.

The apparatus for determining whether an object is moved includes a receiver, a controller and a warning device. In the present invention, when a tolerable probability is inputted, during a predetermined period, the receiver respectively receives signals broadcasted from each base station and the controller measures the signals to derive a first average value. The controller calculates a tolerable range in accordance with the tolerable probability and the first average value. During a unit period, the receiver respectively receives signals broadcasted from each base station and the controller measures the signals to derive a second average value. The controller compares the second average value and the tolerable range. By the comparison, the controller determines whether the object is moved. If moved, the warning device will send out a warning signal.

Another aspect of the present invention is to provide a method and apparatus for measuring a tolerable distance. Within the tolerable distance, an object can be moved without being warned. The object is disposed in a communication system. The object receives N signals broadcasted by N base stations near around.

According to the method of the present invention, during a predetermined period, signals broadcasted from each base station are respectively received and measured in order to derive a first average value and a standard value. Meanwhile, on M points on a circumference of a circle with the object as the center of the circle and the predetermined tolerable distance as the radius of the circle, the method respectively receives and measures signals broadcasted from each base station in order to derive a third average value. Finally, the method compares a difference between the first average value and the third average value with the standard value, and calculates the tolerable distance in accordance with the predetermined tolerable distance and the comparison result.

The apparatus for measuring a tolerable distance includes a receiver, a controller and a memory device. The memory device stores a predetermined tolerable distance. In the present invention, during a predetermined period, the receiver respectively receives signals broadcasted from each base station and the controller measures the signal in order to derive a first average value and a standard value. Meanwhile, on M points on a circumference of a circle with the object as the center of the circle and the predetermined tolerable distance as the radius of the circle, the receiver respectively receives signals broadcasted from each base station and the controller measures the signals in order to derive a third average value. The controller compares a difference between the first average value and the third average value with the standard value. The controller calculates the tolerable distance in accordance with the predetermined tolerable distance and the compared result.

DETAILED DESCRIPTION

Figure 1:
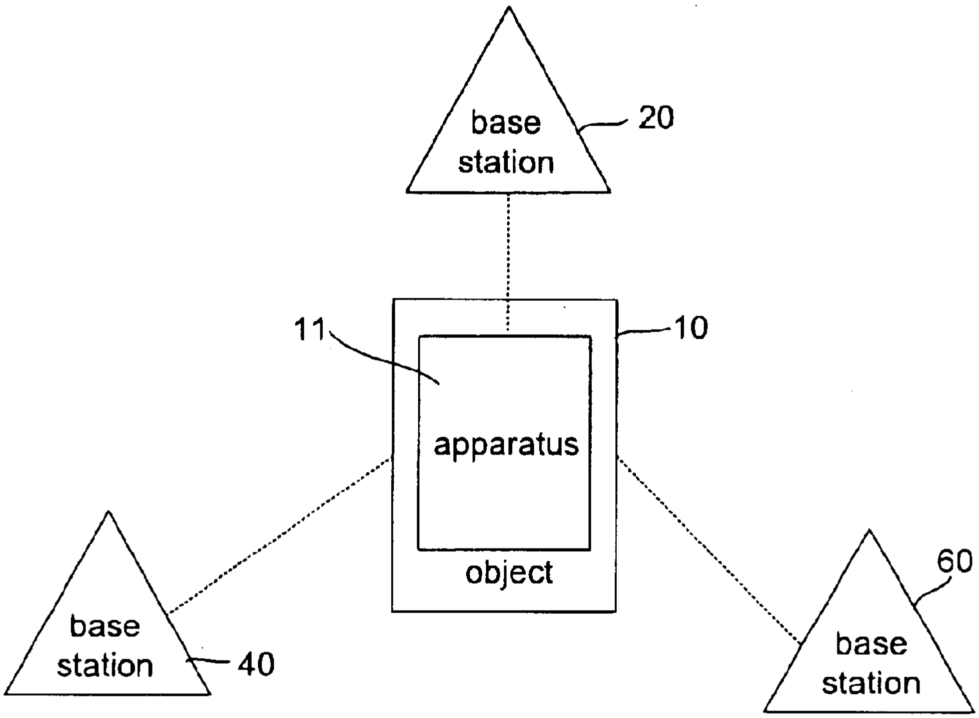
FIG. 1 is a schematic diagram of a communication system of an exemplary embodiment of the present invention.

The present invention provides a method and apparatus for determining whether an object is moved. As shown in FIG. 1, the object 10 is disposed in a communication system. The communication system has N base stations near the object 10 for transmitting signals, and the object receives N signals from the N base station. In this embodiment, N is set to be 3. For example, the three base stations 20, 40 and 60 in the communication system are shown in FIG. 1. It is noted that we use 3 signals from 3 different base stations to decide the position of the object, rather than use one or two signals. Since an object may be located at many points on the circumference of a circle with a base station as the center of the circle in accordance with one signal from the base station, the position of the object can never be accurately decided if using only one signal. Similarly, there are two points intersecting by the circumferences of two circles with two different base stations as the centers of each circle. The position of the object still can not be accurately decided since it may be located at 2 points.

On the other hand, types of the communication system, such as global system for mobile (GSM), code division multiple access (CDMA), and so forth, and the number of the base stations thereof are not limitations in the present invention.

Figure 2:
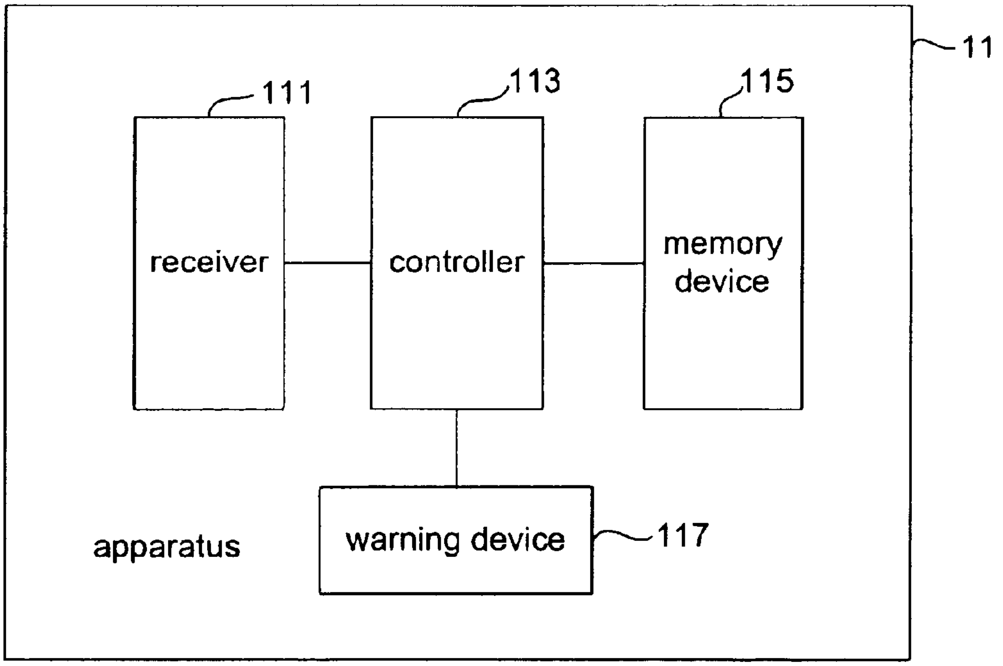
FIG. 2 is a schematic diagram of an apparatus of an exemplary embodiment of the present invention for determining whether an object is moved.

As shown in FIG. 1 and FIG. 2, the apparatus 11 of the present invention is disposed in the object 10, and has a receiver 111, a controller 113, a memory device 115 and a warning device 117.

To simplify the description, in the following embodiments, the present invention assumes that the apparatus 11 only receives and detects signals from one base station. Even through, any person skilled in the art should readily observe that communication systems with more than one base station may also be applied while retaining the teaching of the invention.

Figure 3:
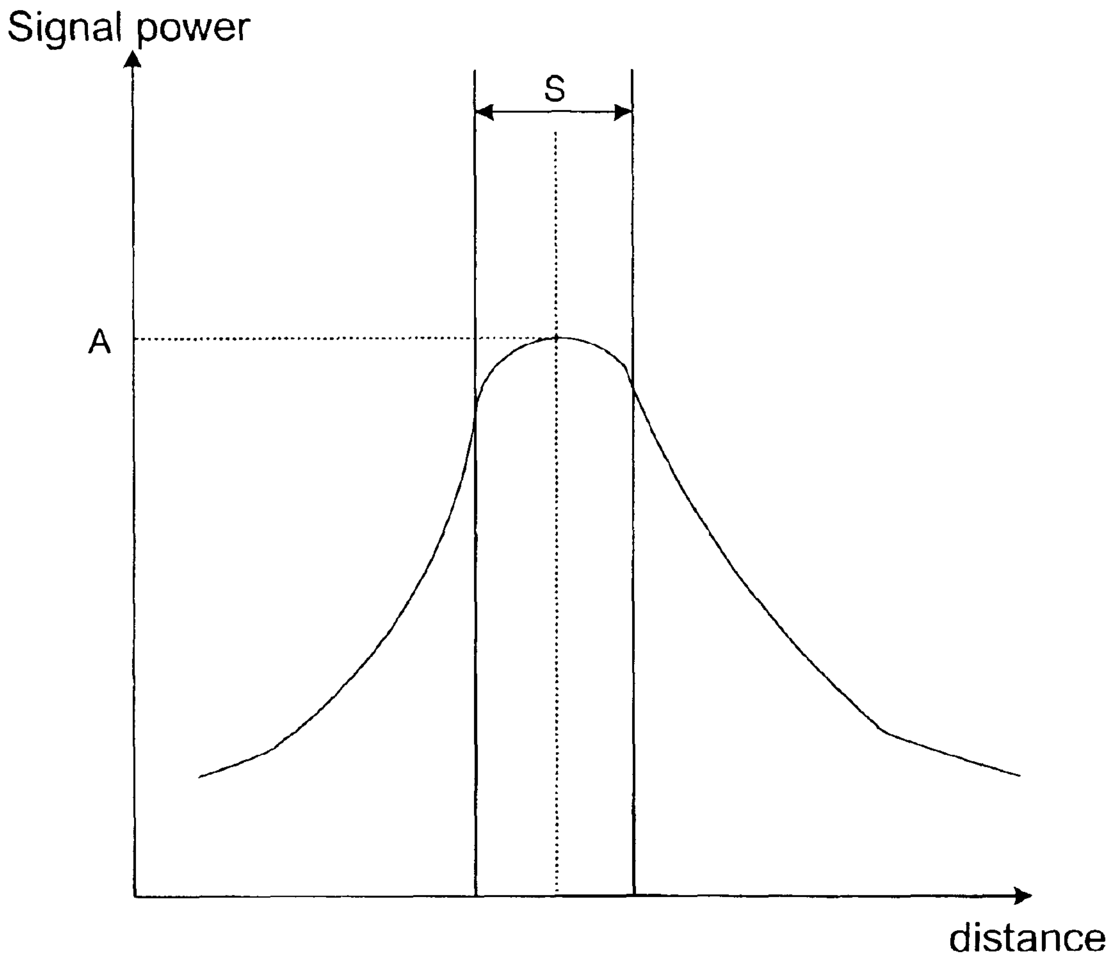
FIG. 3 is a distribution diagram of signals received by the apparatus of the present invention according to one embodiment.

First of all, after the position of the object 10 in a communication system is decided, during a predetermined period, the receiver 111 of the apparatus 11 respectively receives signals broadcasted from a base station and the controller 113 measures the signals and derives a first average value. The memory device 115 records the first average value. In the embodiment, the first average value is a signal power average value of signals received. As shown in FIG. 3, the present invention assumes that signals received from the base station are in form of a normal distribution during the predetermined period. Due to features of a normal distribution, the first average value would be the A point in FIG. 3.

Next, users or owners of the object 10 input a tolerable probability to the controller 113 in accordance with their security requirements or environment conditions. The controller 113 calculates a tolerable range in accordance with the tolerable probability and the first average value. Since there are inevitable signal affections or noise interference problems in every communication system, the tolerable probability mentioned in connection with this embodiment represents a tolerable ratio of the signal interference that users can stand for. And, the tolerable range represents a range in response to the first average value and the tolerable probability. As shown in FIG. 3, the tolerable range is shown as the S region. For example, if the tolerable probability is 0.1 and the first average value of signal strength is 10, the tolerable range would be 9–11. That is, even if the average value of the received signals happens to be 10.5 rather than 10, the present invention will accept the signals because its value is within the tolerable range 9–11.

During a unit period, the receiver 111 continually receives signals broadcasted from each base station and the controller 113 measures the signals and derives a second average value. The unit period can be altered according to user's requirements and environment conditions. There is no limitation toward the unit period in the present invention. The second average value is a signal power average value of signals received.

Finally, the controller 113 compares the second average value and the tolerable range. By the comparison, the controller 113 determines whether the object is moved. In the embodiment, when the second average value is less than the tolerable range, the signals received would be acceptable. Thus, users recognize that the object 10 is not moved. On the contrary, when the second average value is out of the tolerable range, users recognize that the object 10 is being moved. Accordingly, the controller 113 informs of the warning device 117 to send out a warning signal. Once security service guards get the warning signal, they can further examine the object 10, its original location, or just call the police.

As mentioned above, the apparatus of the present invention utilizing signals of a communication system process characteristics and effects of determining whether an object is moved.

To make the invention fully understood, the method of the present embodiment will be further distributed as follows.

Figure 4:
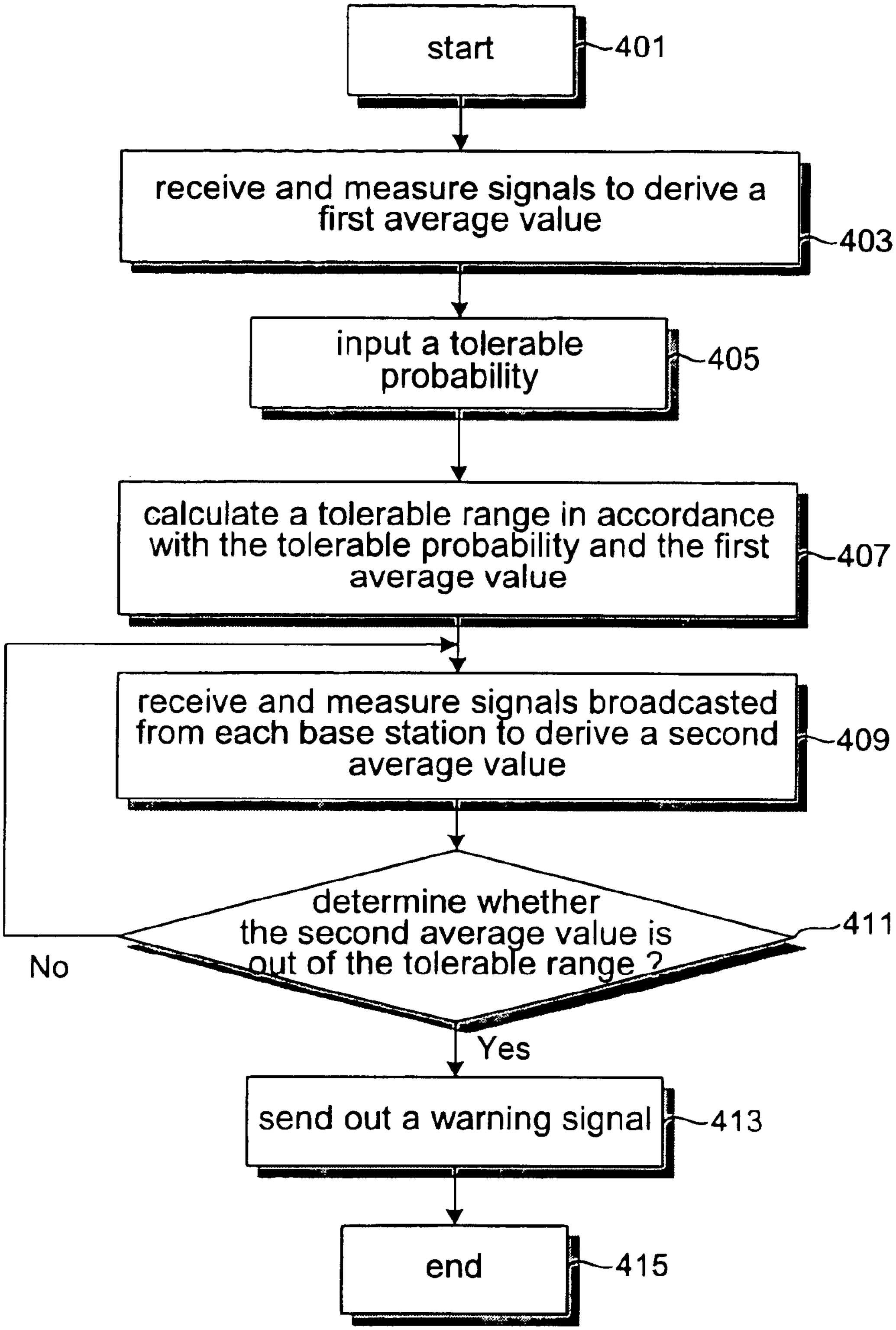
FIG. 4 is a flowchart of a method of the present invention for determining whether an object is moved according to one embodiment.

As shown in FIG. 4, the method of the present invention includes step 401 to step 415 for determining whether an object is moved. The object is disposed in a communication system. The communication system has N signals transmitted by N base stations.

Similarly, to simplify the description, in the following embodiments, the present invention assumes that the invention only receives and detects signals from one base station. Even through, any person skilled in the art should readily observe that communication systems with more than one base stations may also be applied while retaining the teaching of the invention.

After the position of the object in a communication system is decided, in the step 403, during a predetermined period, signals broadcasted from a base station are respectively received and measured to derive a first average value. In the illustrated embodiment, the first average value is a signal power average value of signals received.

In the step 405, users or owners of the object input a tolerable probability in accordance with their security requirements or environment conditions. In the step 407, a tolerable range is calculated in accordance with the tolerable probability and the first average value. Since there are inevitable signal affections or noise interference problems in every communication system, the tolerable probability mentioned in the embodiment represents a tolerable ratio of the signal interference that users can stand for. The tolerable range represents a range in response to the first average value and the tolerable probability.

In the step 409, during a unit period, signals broadcasted from each base station are continually received and measured to derive a second average value. The unit period can be adjusted according to user's requirements and environment conditions. There is no limitation toward the unit period in the present invention. The second average value is a signal power average value of signals received.

Finally, the step 411 compares the second average value and the tolerable range. By the comparison, the present invention determines whether the object is moved. In the embodiment, when the second average value is less than the tolerable range, the signals received would be acceptable. Thus, users recognize that the object is not moved. In contrast, when the second average value is out of the tolerable range, the object is assumed to be moved. Accordingly, in the step 413, a warning signal is sent out. Once security service guards get the warning signal, they can further examine the object, its location, or just call the police.

As mentioned above, the method of the present invention utilizing signals of a communication system process characteristics and effects of determining whether an object is moved.

However, except for static noise interference or building affection, which usually will not change and therefore can be estimated in advance, there are still lots of dynamic and uncontrollable interference in a communication system. Consequently, it is possible that the invention mis-detects the position of the object and does not send out a warning signal even if the object is truly being moved.

To further improve the present invention so as to avoid the above problems, the present invention further provides a method and apparatus for measuring a tolerable distance. Within the tolerable distance, an object can possibly be moved without being warned. Thus, by the invention, users can estimate a possible distance that the object might be moved without being noticed by the present invention, and further find the object within a specific distance.

Figure 5:
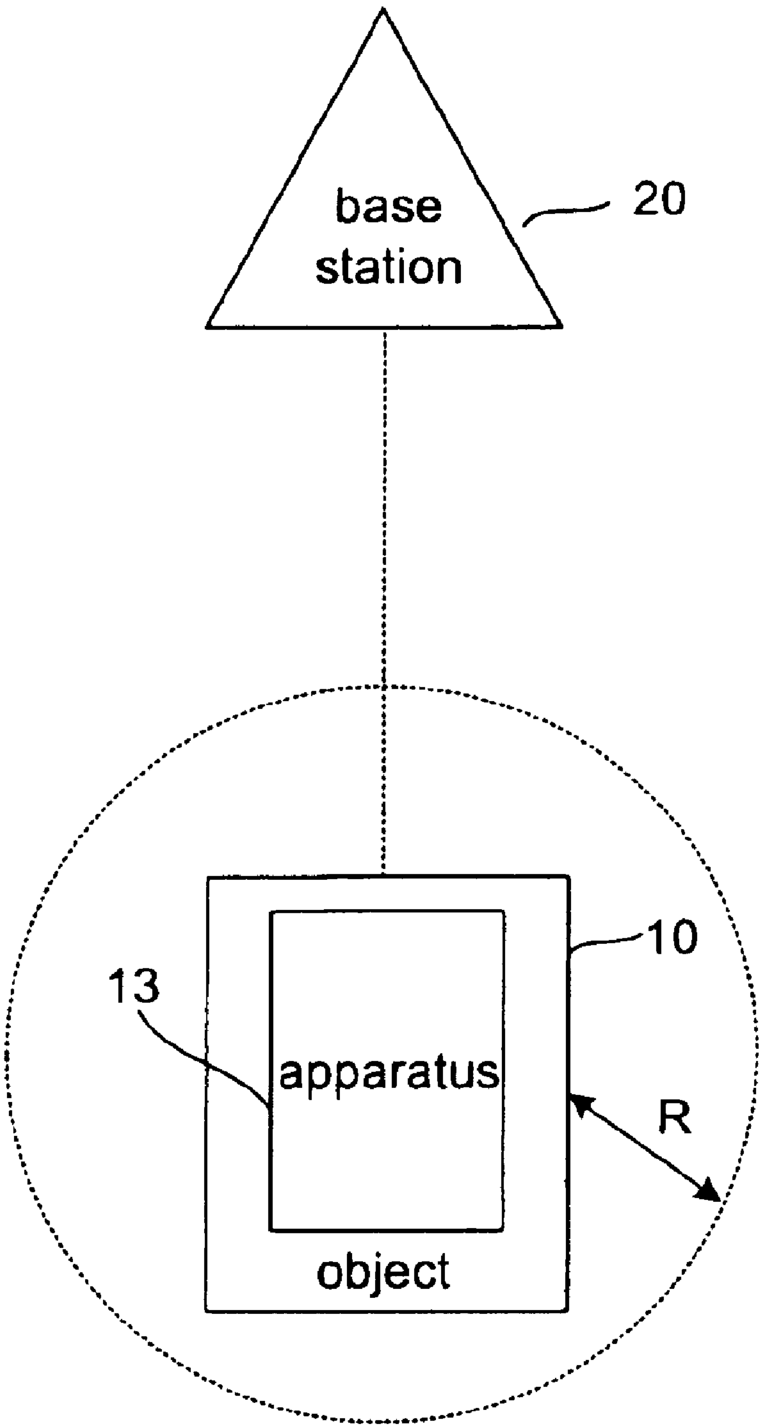
FIG. 5 is a schematic diagram of a communication system of the present invention according to one embodiment.

As shown in FIG. 5, the apparatus 13 of the present invention is used to measure a tolerable distance R. The object 10 is disposed in a communication system. The communication system has N base stations for transmitting signals. However, types of the communication system and the number of the base stations thereof are not limitations in the present invention.

Figure 6:
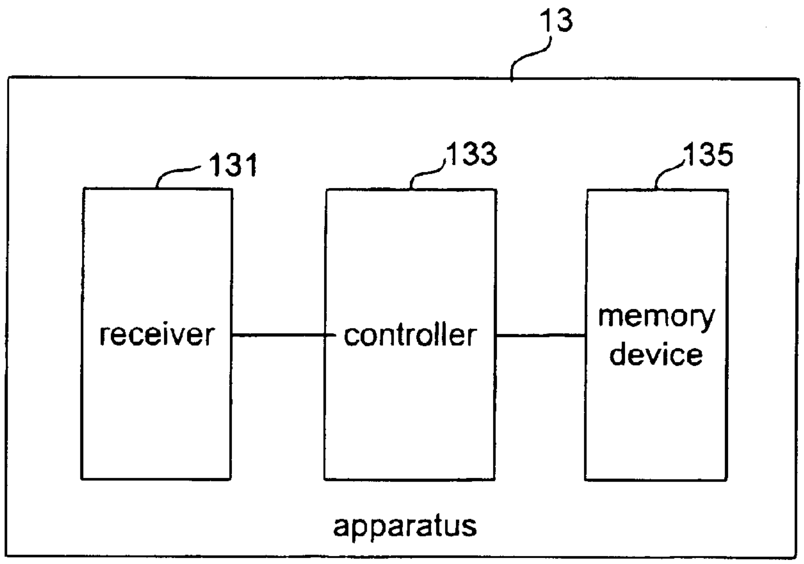
FIG. 6 is a schematic diagram of an apparatus of the present invention for measuring a tolerable distance according to the embodiment.

As shown in FIG. 5 and FIG. 6, the apparatus 13 is disposed in the object 10 and has a receiver 131, a controller 133 and a memory device 135. The memory device 135 stores a predetermined tolerable distance.

Similarly, to simplify the description, as shown in FIG. 5, in the following embodiments, the present invention assumes that the invention only receives and detects signals from the base station 20. Even through, any person skilled in the art should readily observe that communication systems with more than one base stations may also be applied while retaining the teaching of the invention.

Figure 7:
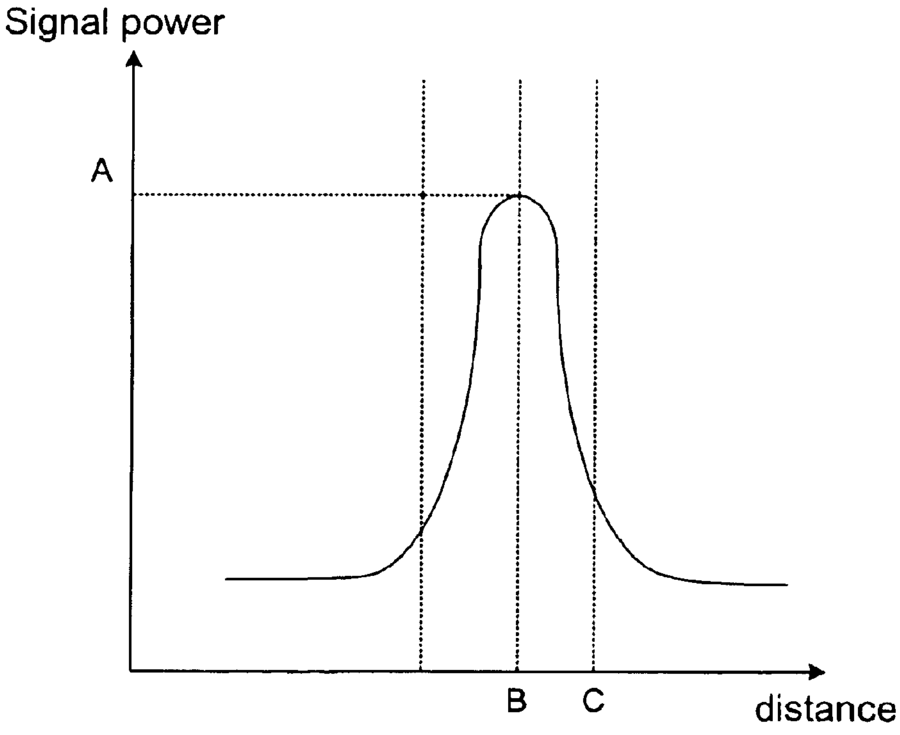
FIG. 7 is a distribution diagram of signals received by the apparatus of the present invention according to the embodiment.

After the position of the object 10 in a communication system is decided, during a predetermined period, the receiver 131 respectively receives signals broadcasted from each base station and the controller 133 measures the signals in order to derive a first average value and a standard value, which are stored by the memory device 135. In the embodiment, the first average value is a signal power average value of signals received. The standard value is a signal power standard value of signals received. As shown in FIG. 7, in the embodiment, the present invention assumes that signals received from the base station are in form of a normal distribution during the predetermined period. Due to features of a normal distribution, the first average value would be the A point in FIG. 7, and the standard value would be the difference between the C point and the B point in FIG. 7.

Meanwhile, the apparatus of the present invention then moves to M points on a circumference of a circle with the object as the center of the circle and the predetermined tolerable distance as the radius of the circle. On each point, the receiver 131 respectively receives signals broadcasted from each base station and the controller 133 measures the signals in order to derive a third average value. The third average value is a signal power average value of signals received.

The controller 133 then compares a difference between the first average value and the third average value with the standard value. Finally, the controller 133 calculates the tolerable distance R in accordance with the predetermined tolerable distance and the compared result. In the embodiment, the tolerable distance R is equal to the predetermined tolerable distance plus the unit distance when the difference is less than the standard value. In contrast, the tolerable distance R is equal to the predetermined tolerable distance minus the unit distance when the difference is greater than the standard value.

As mentioned above, the apparatus 13 of the present invention utilizing signals of a communication system process characteristics and effects of measuring a tolerable distance R at which an object might be moved without being noticed.

To make the invention fully understood, the method of the present embodiment will be further distributed as follows.

Figure 8:
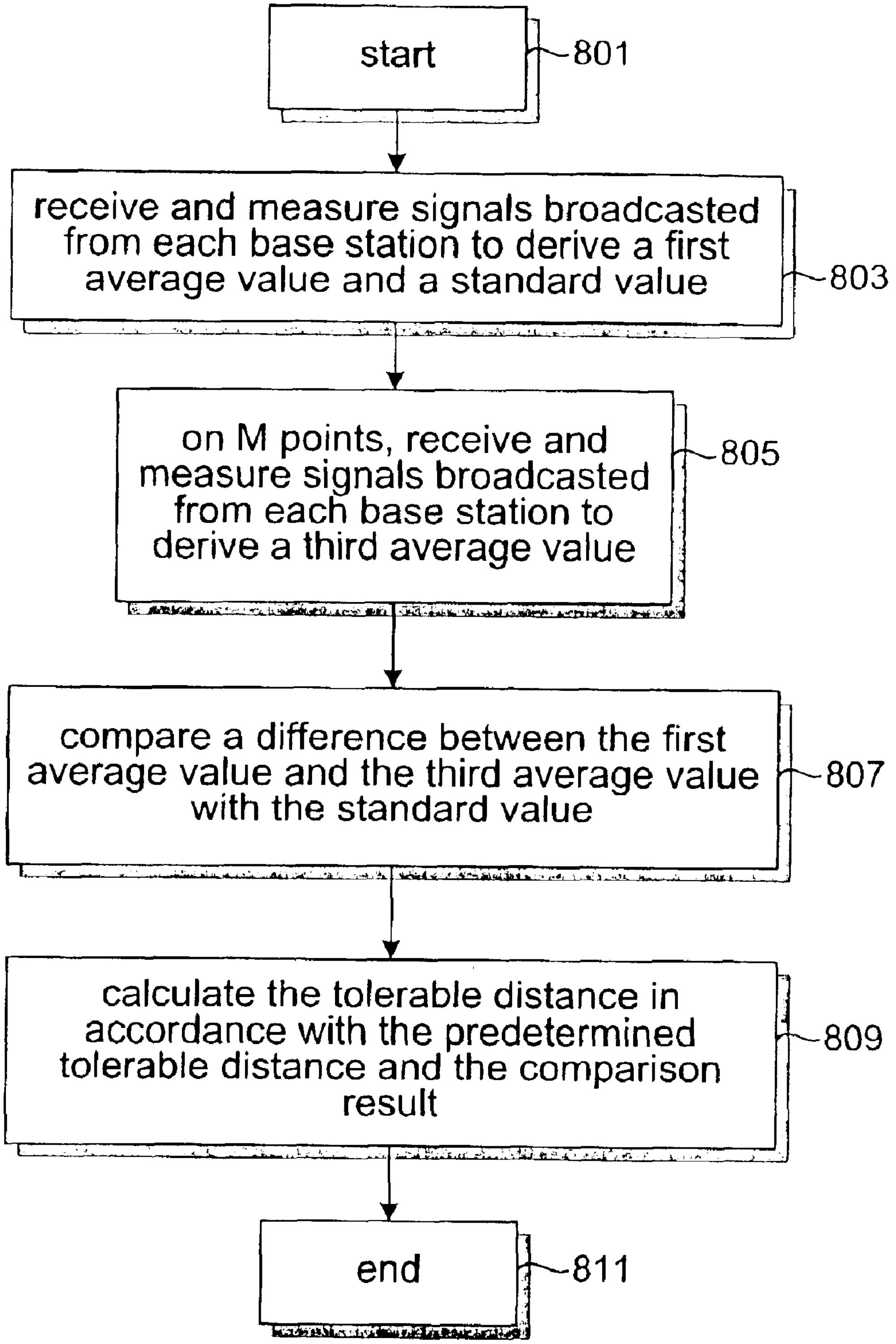
FIG. 8 is a flowchart of a method of the present invention for measuring a tolerable distance according to the embodiment.

As shown in FIG. 8, the method of the present invention includes step 801 to step 811 for measuring a tolerable distance. The object is disposed in a communication system. The communication system has N base stations for transmitting signals.

Similarly, to simplify the description, in the following embodiments, the present invention assumes that the invention only receives and detects signals from one base station. Even through, any person skilled in the art should readily observe that communication systems with more than one base stations may also be applied while retaining the teaching of the invention.

After the position of the object in a communication system is decided, in the step 803, during a predetermined period, signals broadcasted from a base station are respectively received and measured to derive a first average value and a standard value. In the embodiment, the first average value is a signal power average value of signals received. The standard value is a signal power standard value of signals received.

Meanwhile, on M points on a circumference of a circle with the object as the center of the circle and the predetermined tolerable distance as the radius of the circle, the method, in the step 805, respectively receives and measures signals broadcasted from each base station in order to derive a third average value. The third average value is a signal power average value of signals received.

Finally, in the step 807, the method compares a difference between the first average value and the third average value with the standard value, and in the step 809, the method calculates the tolerable distance in accordance with the predetermined tolerable distance and the comparison result. In the embodiment, the tolerable distance R is equal to the predetermined tolerable distance plus the unit distance when the difference is less than the standard value. In contrast, the tolerable distance R is equal to the predetermined tolerable distance minus the unit distance when the difference is greater than the standard value.

In the present invention, the object 10 mentioned above can be, for example, a vending machine or a automatic teller machine. The number N of the base stations in the communication system also is not a limitation in the invention. But, the greater the number N, the higher the detecting accuracy. In a preferred embodiment, the number N is equal to or greater than 3.

In the foregoing specification, the invention has been described with reference to specific embodiments. It will, however, be evident that various modification and changes may be made to thereto without departing from the broader spirit and scope of the invention. The specification and drawings are, accordingly, to be regarded in an illustrative rather than restrictive sense. Thus, it is intended that the present invention covers the modification and variations of this invention provided they come within the scope of the appended claims and their equivalents.

We claim:

1. A method for determining whether an object is moved, wherein said object being disposed in a communication system and having a receiver, said communication system having N base stations for transmitting signals, said method comprising the steps of:

(A) during a predetermined period, respectively receiving and measuring signals broadcasted from each base station to derive a first average value;

(B) inputting a tolerable probability;

(C) calculating a tolerable range in accordance with said tolerable probability and said first average value;

(D) during a unit period, respectively receiving and measuring signals broadcasted from each base station to derive a second average value; and (E) comparing said second average value and said tolerable range.

2. The method of claim 1, further comprises the step of sending out a warning signal as long as said second average value is out of said tolerable range.

3. The method of claim 1, wherein said first average value and said second average value are both signal power average values of signals received by said receiver.

4. The method of claim 1, wherein said N is an integer equal to or greater than 3.

5. A method for measuring a tolerable distance, said object is disposed in a communication system and having a receiver and a memory device, said memory device stores a predetermined tolerable distance, said communication system having N base stations for transmitting signals, said method comprising the steps of:

(A) during a predetermined period, respectively receiving and measuring signals broadcasted from each base station to derive a first average value and a standard value;

(B) on M points on a circumference of a circle with said object as the center of the circle and said predetermined tolerable distance as the radius of the circle, respectively receiving and measuring signals broadcasted from each base station to derive a third average value;

(C) comparing a difference between said first average value and said third average value with said standard value; and (D) calculating said tolerable distance in accordance with said predetermined tolerable distance and a result from step (C).

6. The method of claim 5, wherein said memory device further stores a unit distance, in step (D), said tolerable distance is equal to said predetermined tolerable distance plus said unit distance when said difference is less than said standard value.

7. The method of claim 5, wherein said memory device further stores a unit distance, in step (D), said tolerable distance is equal to said predetermined tolerable distance minus said unit distance when said difference is greater than said standard value.

8. The method of claim 5, wherein said first average value and said third average value are both signal power average values of signals received by said receiver.

9. The method of claim 5, wherein said N is an integer equal to or greater than 3.

10. An apparatus for determining whether an object is moved, wherein said object being disposed in a communication system, said communication system having N base stations for transmitting signals, said apparatus comprising:

a receiver; and a controller;

whereby, when a tolerable probability is inputted, during a predetermined period, said receiver respectively receives signals broadcasted from each base station and said controller measures said signals to derive a first average value; said controller calculates a tolerable range in accordance with said tolerable probability and said first average value; during a unit period, said receiver respectively receives signals broadcasted from each base station and said controller measures said signals to derive a second average value; said controller compares said second average value and said tolerable range.

11. The apparatus of claim 10, wherein said apparatus further comprises a warning device, said warning device sends out a warning signal as long as said second average value is out of said tolerable range.

12. The apparatus of claim 10, wherein said apparatus further comprises a memory device.

13. The apparatus of claim 10, wherein said first average value and said second average value are both signal power average values of signals received by said receiver.

14. The apparatus of claim 10, wherein said N is an integer equal to or greater than 3.

15. An apparatus for measuring a tolerable distance, said object is disposed in a communication system, said communication system having N base stations for transmitting signals, said apparatus comprising:

a receiver;

a controller; and a memory device for storing a predetermined tolerable distance;

whereby, during a predetermined period, said receiver respectively received signals broadcasted from each base station and said controller measures said signals to derive a first average value and a standard value; on M points on a circumference of a circle with said object as the center of the circle and said predetermined tolerable distance as the radius of the circle, said receiver respectively receives signals broadcasted from each base station and said controller measures said signals to derive a third average value; said controller compares a difference between said first average value and said third average value with said standard value; said controller calculates said tolerable distance in accordance with said predetermined tolerable distance and the compared result.

16. The apparatus of claim 15, wherein said memory device further stores a unit distance, said tolerable distance is equal to said predetermined tolerable distance plus said unit distance when said difference is less than said standard value.

17. The apparatus of claim 15, wherein said memory device further stores a unit distance, said tolerable distance is equal to said predetermined tolerable distance minus said unit distance when said difference is greater than said standard value.

18. The apparatus of claim 15, wherein said first average value and said third average value are both signal power average values of signals received by said receiver.

19. The apparatus of claim 15, wherein said N is an integer equal to or greater than 3.

* * * * *